April 13, 1965 E. H. DOERPINGHAUS 3,178,050
CONNECTIONS BETWEEN RIGID AND FLEXIBLE BODIES
Filed Nov. 29, 1960 5 Sheets-Sheet 1

INVENTOR.
ERNST H. DOERPINGHAUS
BY
ATTORNEY

April 13, 1965 E. H. DOERPINGHAUS 3,178,050
CONNECTIONS BETWEEN RIGID AND FLEXIBLE BODIES
Filed Nov. 29, 1960 5 Sheets-Sheet 2

INVENTOR.
ERNST H. DOERPINGHAUS
BY
Michael S. Striker
ATTORNEY

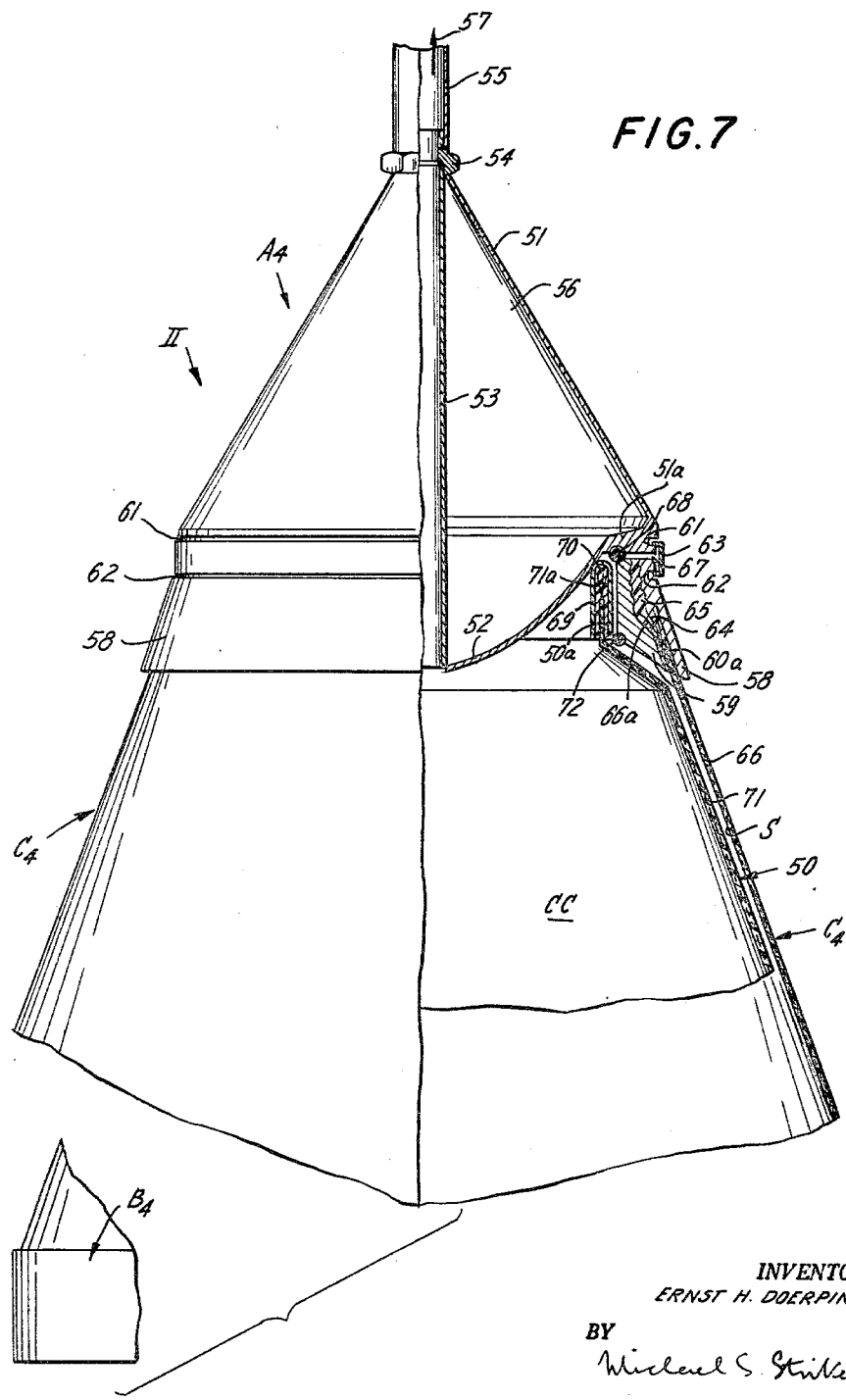

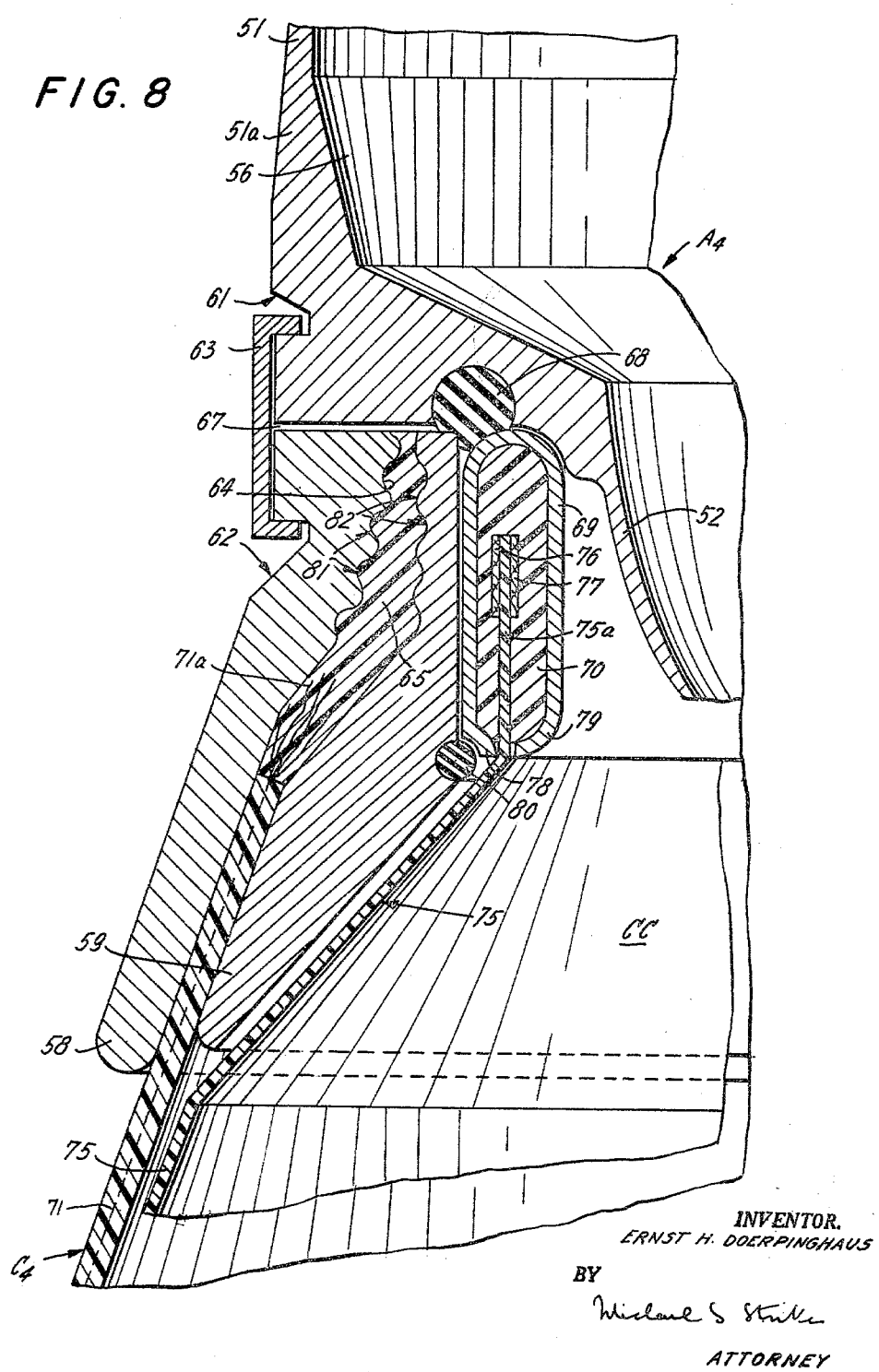

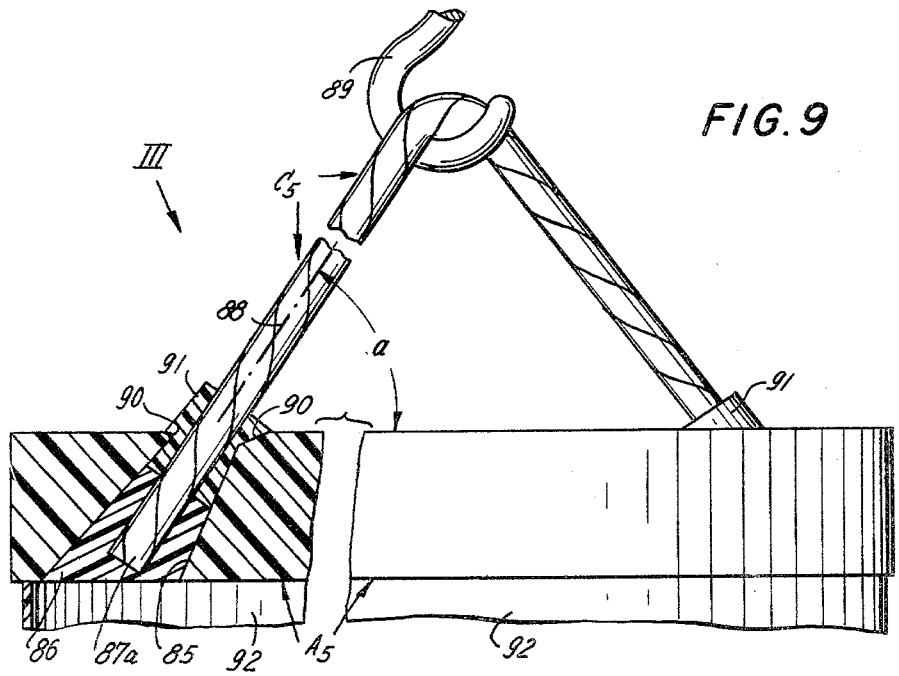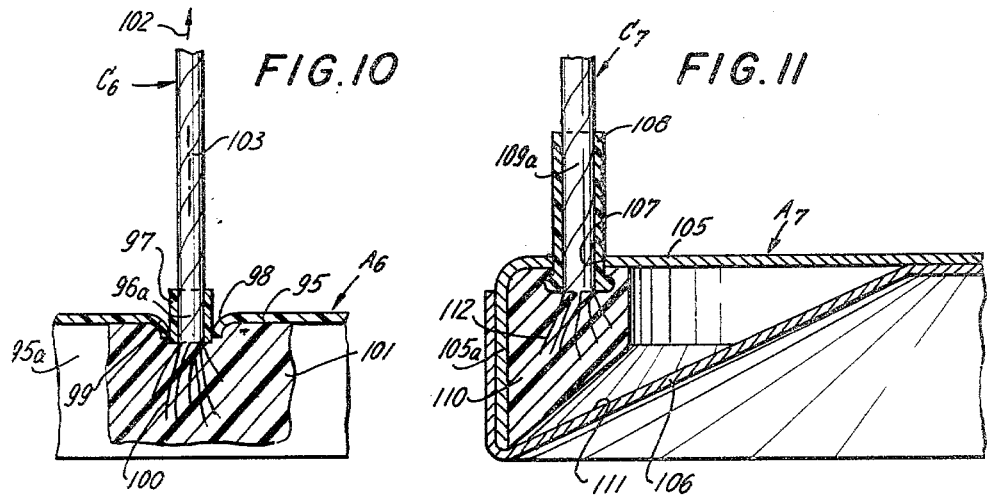

United States Patent Office 3,178,050
Patented Apr. 13, 1965

3,178,050
CONNECTIONS BETWEEN RIGID AND
FLEXIBLE BODIES
Ernst Hans Doerpinghaus, Hamburg, Germany, assignor to Container Patent Co., G.m.b.H., Hamburg, Germany
Filed Nov. 29, 1960, Ser. No. 72,363
Claims priority, application Germany, Jan. 21, 1960,
D 32,403
6 Claims. (Cl. 220—5)

The present invention relates to improvements in connections between rigid and flexible bodies, and more particularly to connections which are especially suited for securing flexible components to rigid components in collapsible containers.

An important object of the invention is to provide a connection which is equally suited for securing a tubular flexible component to a rigid component or for providing a firm joint between a cable-like flexible component and a rigid component.

Another object of the invention is to provide a permanent connection between a rigid component and a flexible component which may be formed at a very low cost, which may be utilized for the formation of permanent bonds between materials of widely different characteristics, and which can withstand very high stresses, for example, the stresses arising when a heavily loaded flexible container is towed in turbulent waters.

A further object of my invention is to provide a connection of the above outlined characteristics which is especially suited for permanently anchoring the end portions of a tubular flexible component in the rigid components of a collapsible container, and which is equally useful for securing the ends of cable-like suspending devices in the rigid components of such containers.

An additional object of the instant invention is to provide a connection of the above described type which is equally useful for securing reinforced and/or non-reinforced flexible components to the rigid components of a collapsible container.

A concomitant object of the invention is to provide a connection which is completely fluid-tight, which can withstand the chemical and/or physical action of all types of cargo, and which will withstand the changes in temperature arising when the container is in actual use.

Still another object of my invention is to provide a collapsible container which embodies a connection of the above outlined characteristics.

A further object of the invention is to provide a container whose flexible component or components are permanently bonded to its rigid components.

An additional object of the invention is to provide a container wherein the connections between the flexible and rigid components require no mechanical elements and are capable of organically bonding the components to each other so that they can remain unchanged for practically unlimited periods of time.

With the above objects in view, the invention resides in the provision of a connection in the form of a suspending arrangement which comprises a hard plastic body or filler preferably consisting of a thermoplastic synthetic material which is permanently bonded to the flexible component and which is preferably permanently anchored in and secured to the rigid component. In one of its preferred forms, the hard filler is anchored in a preferably conical space of and is actually bonded to the rigid component. The radial dimension of the filler increases in a direction away from the flexible component so that the filler acts as a wedge and is even more firmly retained in the rigid component when the forces tending to separate the two components increase. Alternately, the filler may be merely anchored in a cylindrical or conical space provided in the rigid component, i.e., it need not actually adhere to the adjacent walls of the rigid component.

The improved connection may provide an exceptionally strong joint between a rigid component and a flexible component if the latter is formed by or includes longitudinally and/or diagonally extending threads, such as textile threads, synthetic plastic filaments or metallic wires. In such instances, the randomly distributed ends of the threads are individually embedded in the material of the filler to insure that the connection remains intact even if the bond between the filler and the flexible component proper should be weakened or destroyed for a certain reason. For example, the threads may constitute a reinforcing layer in a plastic flexible component or they may actually constitute the entire flexible component, such as a hemp cord, a plastic rope, a braided wire cable, or the like.

In accordance with another feature of my invention, a connection including a hardened filler consisting of a material not capable of forming a strong bond with the material of the flexible component may include one or more elements whose material or materials may be firmly secured both to the filler and to the flexible component. Thus, such types of connections establish an indirect bond between the filler and the flexible component or between the filler and a rigid component if the latter's material, too, cannot form a strong bond with the filler. Such intermediate elements may consist of strips made of a synthetic plastic material which is capable of forming a strong connection with the filler and with the respective component, of strips made of a textile or like material which may be penetrated by the materials of the filler and of the respective component, or of a combination of such strips.

The novel features which are considered as characteristic for the invention are set forth in particular in the appended claims. The invention itself, however, both as to its construction and its method of operation, together with additional objects and advantages thereof, will be best understood from the following detailed description of certain specific embodiments when read in connection with the accompanying drawings, in which:

FIG. 7 is a fragmentary partly elevational and partly sectional view of a modified container which comprises two tubular flexible components;

FIG. 8 is a greatly enlarged fragmentary sectional view of a connection between two tubular flexible components and a rigid component;

FIG. 9 is a partly elevational and partly sectional view of a connection between a rigid component and a cable-like flexible component;

FIG. 10 is a fragmentary sectional view of a modified connection between a rigid component and a cable-like flexible component; and FIG. 11 is a fragmentary sectional view of a further connection between a rigid component and a cable-like flexible component.

Figure 1:
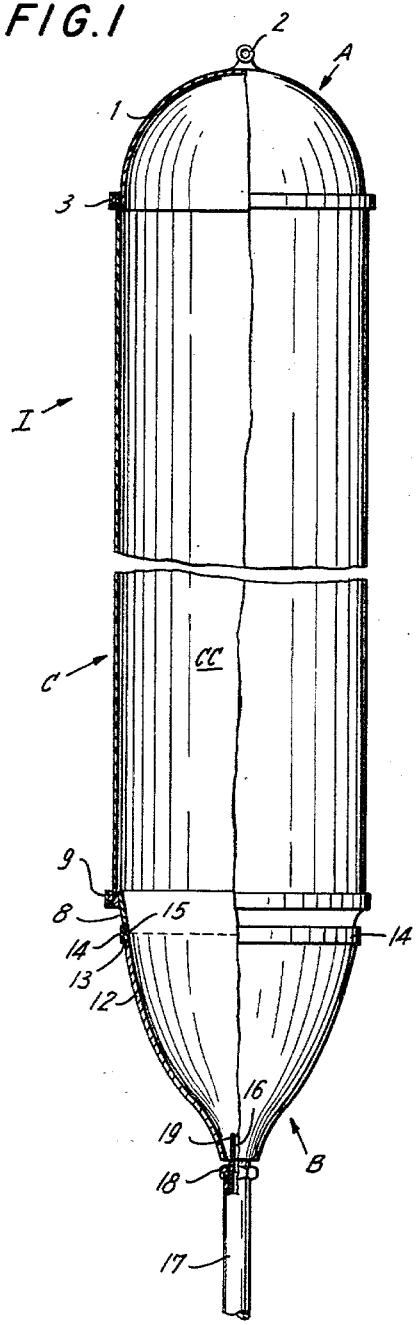
FIG. 1 is a partly elevational and partly sectional view of a collapsible seagoing container embodying two slightly different forms of my invention.

Referring now in greater detail to the drawings, and first to FIG. 1, there is shown a collapsible container I which comprises a first rigid component A, a second rigid component B, and a flexible component C. The flexible component C assumes the form of a tubular body, preferably of circular cross sectional contour, whose end portions 6a, 6b (see FIGS. 2 and 3) are respectively secured and permanently bonded to the rigid components A and B in accordance with two slightly different embodiments of my invention. The connections between the cylindrical flexible component C and the rigid components A, B are of permanent nature, and are preferably fluid-tight so that the cargo chamber CC of the container I may receive a liquid, pulverulent, granular or even gasiform material. In one of its preferred forms, the flexible component C consists of synthetic plastic material which is reinforced by one or more inserts of filamentary material, e.g. textile fabrics whose threads respectively extend in longitudinal and circumferential directions of the flexible component. Alternately, the reinforcing inserts in the flexible component C may consist of non-connected layers of alternating longitudinal and circumferential threads which are embedded in a deformable synthetic plastic substance, e.g. polyvinyl chloride, polyamide artificial rubber or the like. The longitudinally extending threads take up tensional stresses caused by the weight of the lower rigid component B, by the weight of the cargo contained in the chamber CC, and eventually by the superatmospheric pressure of a gaseous substance filling the chamber CC. The circumferentially extending threads take up such stresses which tend to expand the flexible component C, i.e. the stresses produced by the pressure of the material received in the chamber CC. Of course, it is equally possible to reinforce the flexible component C by diagonally extending layers of threads or, if necessary, with longitudinally, circumferentially and diagonally extending threads.

Figure 2:
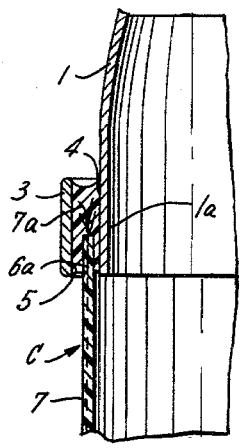
FIG. 2 is an enlarged fragmentary sectional view of the connection between the tubular flexible component and the rigid upper component of the container shown in FIG. 1.

The rigid components A, B may consist entirely or in part of a synthetic plastic material, of metal, or even of wood. The rigid upper component A comprises a substantially semispherical buoy or shell 1 which carries at its outer side a centrally located suspending device in the form of an eye 2 adapted to be engaged by the hook of a crane or another transporting means on which the container I is suspended during storage, transportation, filling of cargo, or evacuation of cargo. As is shown in FIG. 2, the annular lower end portion 1a of the shell 1 is spacedly surrounded by an outer annular member 3 so that the annular portion 1a and the annular member 3 define between themselves an annular filler-receiving space 4 adapted to receive a hardened plastic body or filler 5 whose material is of such nature as to adhere with very great force to the inner side of the annular member 3 as well as to the outer side of the annular portion 1a in order to firmly hold these parts in the position of FIGS. 1 and 2 and to simultaneously retain the upper end portion 6a of the flexible component C so that the hard filler 5 constitutes a connecting block between the rigid component A and the flexible component C. In order to insure that the bond between the hardened plastic mass which constitutes the hard filler 5 and the annular upper end portion 6a of the flexible component C will be capable of withstanding very high tensional stresses in the longitudinal direction of the container I, it is preferred to extend the randomly distributed upper ends 7a of the longitudinal reinforcing threads 7 beyond the upper edge of the end portion 6a so that the projecting ends 7a of the threads 7 are individually embedded in and are bonded to the filler 5. These longitudinal threads 7 extend the full length of the flexible component C. Of course, if the flexible component is reinforced by longitudinal and/or diagonal threads, the ends of such diagonal threads, too, will preferably extend upwardly and beyond the end portion 6a to be individually embedded in the filler 5.

It will be noted that the axial length of the cylindrical annular space 4 is sufficient to accommodate an end portion 6a of such length as to insure a satisfactory connection between the components A, C regardless of the weight of the cargo in the chamber CC and regardless of any other longitudinal stresses which may arise during transportation, storage or handling of the container I. The material of the filler 5 and the length of the end portion 6a are selected by full consideration of the weight of the container I in loaded condition. Furthermore, the axial length of the space 4 is such that the length of projecting ends 7a of the threads 7 is sufficient to insure a satisfactory bond between the ends 7a and the filler 5 even if the direct connection between the filler and the flexible component is weakened or destroyed. It will be readily understood that the circumferential reinforcing threads (not shown in FIGS. 1–3) need not extend into the filler 5.

Figure 3:
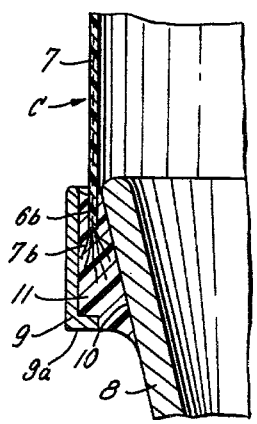
FIG. 3 is enlarged fragmentary sectional view of the connection between the tubular flexible component and the rigid lower component of the container shown in FIG. 1.

The connection between the lower rigid component B and the lower annular end portion 6b of the flexible component is shown on a larger scale in FIG. 3. The lower component B comprises an inner annular member 8 which is of conical shape and which diverges in a direction toward the flexible component C. This inner annular member 8 is spacedly surrounded by a suitably profiled outer annular member 9 so that the annular members 8, 9 define between themselves an annular space 10 which receives a hard filler 11. The hardened material of the filler 11 fills the annular space 10 all the way from the open ends of the annular members 8, 9 which are adjacent to the end portion 6b and to the inwardly extending annular flange 9a of the outer annular member 9 provided at that end of this annular member which is distant from the end portion 6b. The randomly distributed lower ends 7b of longitudinal and/or diagonal reinforcing threads 7 extend beyond the lower end portion 6b of the flexible component C and are firmly embedded in the hard filler 11. As shown, the radial width of the space 10 diminishes in a direction toward the lower end portion 6b of the flexible component C so that the cross section of the filler 11 assumes the shape of a wedge which also contributes to its retaining action by preventing the hardened filler from passing through the narrower upper end zone of the space 10 even if the filler should become separated from the inner side of the outer annular member 9 or from the outer side of the inner annular member 8. Since the weight of the inner annular member 8 and the weight of cargo contained in the lowermost zone of the chamber CC within the rigid lower component B tend to urge the inner annular member 8 in downward direction, the inwardly extending flange 9a will prevent a separation of the annular members 8, 9 even if the hard filler 11 should not adhere to the adjacent sides of these annular members. In other words, as long as the filler 11 remains hard, and as long as the container I is suspended on the eye 2, the flexible component C cannot become separated from the lower grid component B. The inner annular member 8 is subjected to radially outwardly directed deforming stresses when the container I is suspended on the eye 2; therefore, its thickness must be sufficient to withstand such stresses under all conditions of actual use.

The rigid lower component B comprises a substantially buoy-shaped shell 12 whose open upper end portion is preferably releasably connected with the smaller-diameter end of the inner annular member 8. The connection between the open end portion of the shell 12 and the inner annular member 8 comprises a clamping ring 13 which is of U-shaped cross sectional contour and whose exact construction and mounting will be described in greater detail in connection with FIGS. 7 and 8, as well as an annular gasket 14 which seals the cargo chamber CC from the surrounding atmosphere in a plane 15 indicating the line of connection between the shell 12 and the inner annular member 8. The inwardly extending annular portions or arms of the clamping ring 13 are received in complementary annular grooves provided in the parts 8 and 12, and the gasket 14 is sufficiently compressed to prevent escape of cargo or the entry of air along the plane 15. The clamping ring 13 serves as a means for transmitting tensional stresses from the shell 12 to the inner annular member 8 and thence to the flexible component C.

The lowermost end of the shell 12 is formed with an opening 16 which communicates with a preferably flexible pipe 17 serving as a means for filling or evacuating the cargo chamber CC. The upper end of the pipe 17 carries a rotary nut 18 which may be screwed onto an externally threaded nipple 19 secured to the lowermost end of the shell 12 and defining therewithin the aforementioned opening 16.

Referring back to FIGS. 2 and 3, it will be readily understood that, particularly if the container I is comparatively small and if it is intended for the reception of lightweight cargo, i.e. a cargo with low specific weight, the outer annular members 3 and 9 may be dispensed with so that the strength of the permanent connection between the end portions 6a, 6b of the flexible component C and the rigid components A, B, respectively, depends solely on the strength of the bond between the filler 5 and the shell portion 1a on the one hand, as well as between the filler 11 and the inner annular member 8 on the other hand. The outer annular member 3 in the connection of FIG. 2 serves an additional purpose of preventing deformation of the lower end portion 1a of the shell 1 in response to substantial pressures prevailing in the cargo chamber CC because such deformation of the end portion 1A could produce fissures in the filler 5 and would weaken or destroy the bond between the filler 5 and the shell 1. In addition, the outer annular members 3, 9 are of great assistance during the introduction of liquefied filler material into the annular spaces 4, 10, respectively, by bounding the outer sides of these spaces so that the fillers 4, 11 may harden and may assume the form of annuli with uniform cross sectional area. The thickness of the inner annular member 8 in the connection of FIG. 3 is sufficient to prevent deformation in response to internal pressures so that the outer annular member 9 need not be dimensioned with a view to assist the companion member 8 in retaining its shape in actual use of the container.

Figure 4:
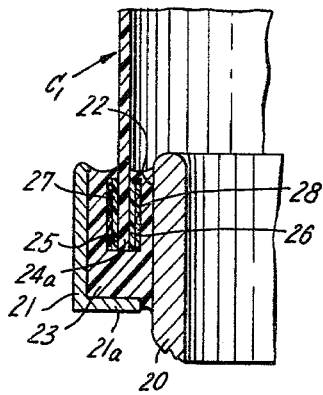
FIG. 4 is a fragmentary sectional view of a connection between a non-reinforced tubular flexible component and a rigid component.

FIG. 4 illustrates a modified connection which is often preferred in the event that the tubular flexible component $C_1$ is without a reinforcing fabric layer. The connection comprises an inner annular member 20 which is shown in the form of a thick-walled cylinder, an outer annular member 21 which is formed with an inwardly extending annular flange 21a and which defines with the inner annular member 20 an annular space 22 for a hard filler 23, the latter being of such nature as to adhere with great force to the outer side of the inner annular member 20 as well as to the inner side of the outer annular member 21. The end portion 24a of the flexible component $C_1$ is assumed to be of such material that it does not form a good bond with the material of the filler 23. Therefore, the opposing sides of the end portion 24a are coated with plastic strips or bands 25, 26 which are capable of forming a good and strong bond with the material of the flexible component $C_1$. The exposed sides of the strips 25, 26 are respectively coated with liners 27, 28 of textile material which, in turn, are firmly embedded in the filler 23. For example, the strips 25, 26 may be coated with liners 27, 28, respectively, in a separate manufacturing step so that the composite strips 25, 27 and 26, 28 may be bonded or welded to the end portion 24a in a first step and may be embedded in the still plastic filler 23 in a subsequent step. In such instances, the strips 25, 26 may consist of the same plastic material of which the flexible component $C_1$ is made. It has been found that the bond between the exposed sides of the liners 27, 28 and the filler 23 is frequently sufficiently strong, particularly if the container is comparatively small, so that the forces acting in the longitudinal and/or circumferential direction of the flexible component are within a permissible range, if the container is utilized for the reception of goods with a low specific weight, or if the flexible component $C_1$ need not take up all longitudinal or circumferential stresses. For example, the flexible component $C_1$ may constitute a protective outer or inner coat or wrapper for the actual or main flexible component which latter is normally reinforced in a manner as shown in FIGS. 2 and 3 so that it can withstand substantial stresses in actual use of the container. Such external or internal wrappers are often desirable to prevent direct frictional contact of a solid object with the main flexible component or to provide a fluid-tight outer or inner coat for the latter. Furthermore, the main flexible component might be strong enough to take up substantial longitudinal and/or circumferential stresses but its material might be such that it cannot withstand the action of certain solid, gaseous or liquid substances, e.g. various chemicals. In such instances, the main flexible component may be provided with an external wrapper, such as the flexible component $C_1$, whose composition is such that it can withstand the action of aforementioned solid, gaseous or liquid substances. Of course, the flexible component $C_1$ may also constitute an internal casing for the main flexible component so as to prevent direct contact between the main flexible component and the cargo, to provide a thermal insulation between the cargo and the main flexible component, or to form a fluid-tight seal between the cargo and the main flexible component.

The flexible component $C_1$ may consist of soft polyvinyl chloride, of polyethylene or of a similar synthetic plastic substance. Certain of these substances cannot form permanent adhesive bonds with a number of materials, e.g. with the material of the filler 23, with the material of the inner annular member 20, or with the material of the outer annular member 21. On the other hand, it is often desirable to utilize a flexible component $C_1$ (either as an external wrapper for the main flexible component or as an internal casing for the main flexible component) whose plasticity is so high that it cannot form a satisfactory bond with a filler or with a solid metallic or plastic body, such as the annular member 20 or 21.

It will be noted that the connection of FIG. 4 corresponds in many respects to the connection shown in FIG. 2 or 3. Thus, the filler 23 adheres to the adjacent sides of two rigid annular members 20, 21, and the threads of the liners 27, 28 are bonded to the filler 23 as well as to the end portion 24a of the flexible component $C_1$. Of course, it is equally possible to bond the liners 27, 28 directly to the opposite sides of the end portion 24a, i.e. to omit the strips 25, 26, or to replace the liners 27, 28 by strips consisting of felt or the like in a manner to be described in greater detail in connection with FIG. 8. However, it has been found that it is simpler to apply liners of a textile or like material to individual strips 25, 26 in a first step, and to thereupon weld the strips 25, 26 to the end portion 24a in a subsequent step, either simultaneously with the introduction of the filler 23 into the annular space 22 or prior to the introduction of the filler.

Figure 5:
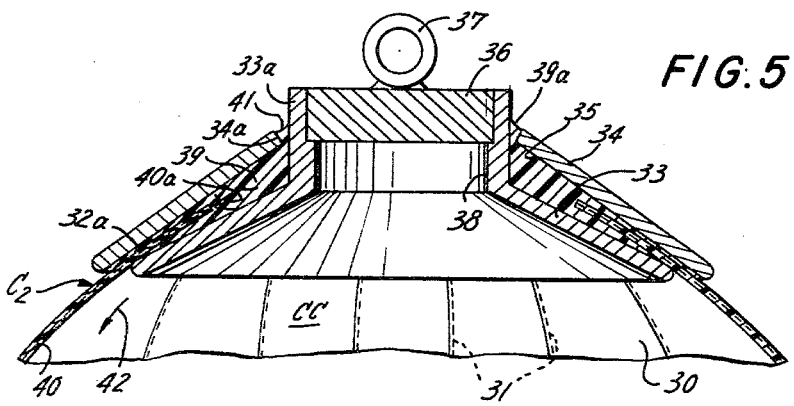
FIG. 5 is a fragmentary sectional view of a connection between a reinforced hollow spherical flexible component and a rigid component.

FIG. 5 illustrates a modified connection which is particularly suitable for sealing an opening in a substantially spherical or semispherical flexible component $C_2$. For example, the flexible component $C_2$ may form part of a container which has a lower end formed by a rigid component similar to the rigid component B of FIG. 1. As shown in FIG. 5, the semispherical flexible component $C_2$ is formed with segmental portions or darts 30 whose overlapping edges are secured to each other by stitches 31. Of course, it is equally possible to simply form the cylindrical component with a number of folds or pleats without actually stitching the folds to each other. The annular end portion 32a of the flexible component $C_2$ which surrounds a substantially circular cutout therein assumes the shape of a hollow cone and is received in an annular space 35 formed between an inner annular member 33 and an outer annular member 34. The inner annular member 33 is provided with a coaxial extension or nipple 33a which is formed with internal threads so as to receive an externally threaded plug 36 which includes a suspending device in the form of an eye 37 serving as a means for suspending the container on the hook of a crane or the like. Of course, the eye 37 represents but one of the many possible suspending devices for facilitating the handling of the container.

The conically shaped annular members 33, 34 diverge outwardly in a direction away from the cylindrical nipple 33a which latter defines an opening 38 through which cargo may be introduced into or evacuated from the chamber CC defined by the flexible component $C_2$. It will be noted that the outer ends of the annular members 33, 34 converge toward each other so that the cross sectional area (i.e. the radial dimension) of the space 35 decreases in a direction away from the opening 38. This space receives a filler 39 consisting of a hardened synthetic plastic substance 39 which adheres with great force to the adjacent sides of the annular members 33, 34 so that these annular members normally retain their position with respect to each other. The annular end portion 32a of the flexible component $C_2$, is embedded in and bonded to the filler 39 so that it forms a rigid unit with the two annular members. In order to insure that the connection of FIG. 5 may withstand substantial tensional stresses, the ends 40a of the reinforcing threads 40 in the plastic material of the flexible component $C_2$, project in random distribution beyond the end portion 32a and are firmly embedded in the hardened material of the filler 39 in a manner as fully described in connection with FIGS. 2 and 3.

It will be noted that the smaller-diameter annular edge face 34a of the outer annular member 34 is outwardly inclined with respect to the periphery of the nipple 33a so as to form a comparatively narrow outwardly diverging annular gap 41 which serves as an inlet during the pouring of liquefied plastic bonding material into the annular space 35 to form the filler 39. In forming the connection of FIG. 5, it is preferred to insert the end portion 32a of the flexible component $C_2$ between the outer ends of the annular members 33, 34 in a first step, and to thereupon press the outer annular member 34 against the inner annular member 33 so that their larger-diameter ends sealingly engage the opposite sides of the flexible component $C_2$. The liquefied plastic is then poured through the inlet 41 so that the annular space 35 and the inlet 41 are completely filled. The liquefied plastic cannot escape from the space 35 because the flexible component $C_2$ is sealingly wedged between the annular members 33, 34. As the plastic material sets to form the filler 39, the hardened material in the inlet 41 forms an outwardly diverging neck 39a and the inclined edge face 34a of the outer annular member 34 prevents any displacements of this annular member with respect to its companion member 33. Since the cross section of the filler 39 in a radial plane is similar to a wedge, the filler cannot be withdrawn in a direction away from the nipple 33a even if its bond with the adjacent sides of the annular members 33, 34 is terminated, i.e. the flexible component $C_2$ will remain safely connected with the annular members 33, 34 as long as its bond with the filler 39 can withstand stresses acting in the direction of the arrow 42 or circumferentially of the flexible component.

The plug 36 may be replaced by a faucet or a valve, particularly if the cargo chamber CC is intended for reception of a liquid or pulverulent substance.

Figure 6:
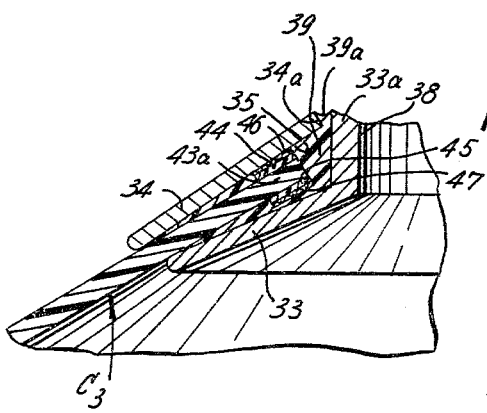
FIG. 6 is a fragmentary sectional view of a connection between a non-reinforced hollow spherical flexible component and a rigid component.

FIG. 6 illustrates a connection which is a combination of the connections shown in FIGS. 4 and 5. The flexible component $C_3$ is without reinforcing threads, and it is assumed that its material cannot form a strong bond with the material of the filler 39. Therefore, the opposite sides of the annular end portion 43a forming part of the flexible component $C_3$ are bonded to a pair of plastic strips 44, 45 whose material may be the same as the material of the end portion 43a, i.e. the end portion 43a is capable of forming a very satisfactory bond with the strips 44, 45. The outer sides of the strips 44, 45 are respectively coated with textile or like liners 46, 47 each of which is firmly embedded in the material of the hardened filler 39. In this manner, one can obtain a very satisfactory connection between the non-reinforced flexible component $C_3$ and the rigid component including the annular members 33, 34 even though the material of the flexible component cannot be welded directly to the filler 39. Of course, it is equally possible to replace the composite strips 44, 46 and 45, 47 by single strips of a plastic material which forms a good bond not only with the material of the flexible component $C_3$ but also with the hardened filler 39. As was explained hereinabove, the non-reinforced flexible component $C_1$ or $C_3$ may form an external wrapper or an internal lining for the main flexible component whose body is then reinforced in the manner as shown in FIGS. 2-3 and 5.

Though the rigid components of FIGS. 1-6 were hatched for metal, it will be readily understood that they may consist of a suitable synthetic plastic material or of any other substance which can resist deformation and which can withstand stresses arising during transportation, handling or storage of a loaded container.

Referring now to FIG. 7, there is shown a portion of a collapsible container II which comprises essentially a rigid upper component $A_4$, a main flexible component $C_4$, and a rigid lower component $B_4$ which latter is assumed to consist of a disc-shaped plate so that the container II may be supported on the ground. The container further comprises a second flexible component 50 which constitutes an internal lining for the main flexible component $C_4$. In the embodiment of FIG. 7, not only the main flexible component $C_4$ but its flexible liner 50, too, is formed with one or more layers of reinforcing textile material so that the lining 50 is capable of taking up substantial longitudinal and circumferential stresses and that the composite flexible component $C_4$, 50 constitutes a very strong wall for the cargo chamber CC.

The rigid upper component $A_4$ comprises a main body portion in the form of a hollow conical shell or buoy 51 whose larger-diameter end is integral with and sealed by a convex or semispherical end wall or bottom 52. The shell 51 is coaxially traversed by a pipe 53 which communicates with the cargo chamber CC and whose upper end is connected to a threaded nipple 54 serving as a means for retaining one end of a hose 55 which is connectable to a source of cargo so that the cargo may be introduced into or evacuated from the chamber CC by flowing through the interior of the pipe 53 and through the hose 55. The pipe 53, the conical shell 51, and the latter's convex end wall 52 define between themselves a fluid-tight compartment 56 which may be filled with air or with another gas in order to increase the buoyancy of the container II if the container is utilized as a partly or fully submerged seagoing receptacle for large quantities of cargo in a manner as disclosed in my copending application Serial No. 684,813 for "Floating Tank." In such instances, the hose 55 may simultaneously serve as a cable for connecting the container II to a watercraft and for moving the container in the direction indicated by the arrow 57.

The rigid upper component $A_4$ further comprises a substantially conical outer annular member 58 and a substantially conical inner annular member 59, these annular members serving as a means for retaining between themselves the upper end portion 60a of the main flexible component $C_4$. The outer annular member 58 is connected with a reinforced zone 51a of the shell 51 which is provided at the junction of this shell with the convex bottom 52. To that end, the reinforced zone 51a and the outer side of the outer annular member 58 are respectively formed with annular grooves 61, 62 to receive the inwardly extending annular flanges or arms at the opposite ends of a clamping or retaining ring 63. Thus, the clamping ring 63 transmits tensional stresses from the outer annular member 58 to the shell 51, and vice versa.

The annular members 58, 59 define between themselves an annular space 64 which receives a filler 65 whose hardened material forms a strong bond with the adjacent sides of the annular members 58, 59. It will be noted that the upper portion of the annular space 64 is bounded by corrugated or otherwise roughened walls so as to insure a more firm connection between the hard filler 65 and the annular members 58, 59. In addition, the conically diverging annular space 64 is of meandering cross sectional contour which also contributes to a firmer engagement between the filler 65 and the annular members 58, 59 not only by increasing the total area of contact but also by insuring that the hard filler 65 remains in the space 64 even if its bond with the one or the other of annular members 58, 59 is terminated. The upper end portion 60a of the main flexible component $C_4$ is firmly embedded in the lowermost zone of the filler 65, whereas the ends 66a of the reinforcing textile threads 66 project beyond the end portion 60a and are permanently embedded in the upper zone of the filler 65. Such configuration of the filler 65 and of the space 64 insures a very satisfactory connection between the annular members 58, 59 and the flexible component $C_4$ which is strong enough to successfully withstand very large stresses which might arise if a heavily loaded container is towed in turbulent waters. Of course, and as mentioned hereinabove, the reinforcing layer or layers 66 need not extend only longitudinally of the flexible component $C_4$ but may extend diagonally thereto as well as in circumferential direction to assist the flexible component in withstanding substantial expanding forces.

When the clamping ring 63 is removed to permit a separation of the shell 51 from the outer annular member 58, the aperture within the inner annular member 59 may serve as a manhole to provide access to the cargo chamber CC, for example, for inspecting the condition of the lining 50, for facilitating the cleaning of the lining 50 in the event that the chamber CC is about to receive a different cargo, for facilitating more rapid filling of the cargo chamber, for facilitating more rapid evacuation of the cargo chamber, or for any other reason.

The slight radial gap 67 between the shell 51 and the annular member 58 is sealed by an annular gasket 68 which is inserted into suitable annular notches of the reinforced zone 51a and of the inner annular member 59. This gasket 68 may consist of a rubber-like material, of a resilient synthetic plastic substance, or it may assume the form of a hydraulic or pneumatic seal of any known design.

A third or innermost annular member 69 of U-shaped cross sectional contour is provided adjacent to the inner side of the inner annular member 59 to serve as a means for connecting the upper end portion 50a of the lining 50 with the rigid component $A_4$. The end portion 50a extends into the downwardly opening annular space within the innermost annular member 69 which contains a filler 70 consisting of a hardened material adapted to form a firm bond with the inner sides of the member 69. As shown, the ends 71a of the reinforcing layer or layers 71 in the lining 50 extend beyond the end portion 50a and are firmly embedded in the hard filler 70. The connection between the annular members 59, 69 consists of an annular gasket 72 which simultaneously seals the narrow gap between the adjacent sides of the annular members 59, 69 so that the intermediate space S between the main flexible component $C_4$ and its lining 50 is sealed from the atmosphere. Of course, a stronger connection between the annular members 59, 69 might become necessary if the lining 50 is called upon to take up substantial longitudinal and/or circumferential stresses. It will be readily understood that, in the event that the intermediate space S between the flexible component $C_4$ and its lining 50 need not be sealed from the cargo chamber CC and from the atmosphere, the gasket 72 may be replaced by a conventional snap ring or the like.

The connection between the rigid lower component $B_4$ and the lower end portions of the flexible components $C_4$, 50 may be the same as the connection of these flexible components with the rigid upper component $A_4$.

FIG. 8 is an enlarged fragmentary sectional view of the connection between the rigid upper component $A_4$ and the main flexible component $C_4$, further showing the connection between the rigid component $A_4$ and a slightly different lining 75. This lining is not reinforced and, therefore, its connection with the inverted U-shaped innermost annular member 69 is preferably of the type as shown in FIGS. 4 and 6. Thus, the opposing sides of the end portion 75a forming part of the lining 75 are coated with two strips 76, 77 consisting of felt, of a textile or like material, and these strips are permanently embedded in the material of the hard filler 70. It will be noted that the lower ends of the two concentric portions forming part of the innermost annular member 69 are bent toward each other, as at 78 and 79, so as to prevent complete withdrawal of the filler 70 even if this filler should become separated from the adjacent sides of the annular member 69. As clearly shown in FIG. 8, the inwardly bent portion 78 of the annular member 69 simultaneously provides a seat for a snap ring 80 which holds the innermost annular member 69 in position with respect to the inner annular member 59.

FIG. 8 illustrates in greater detail the corrugated walls 81, 82 of the annular space 64 which receives the filler 65. These walls contribute to the retaining action of the annular members 58, 59 and this retaining action is further enhanced owing to the fact that the cross sectional area of the annular space 64 diminishes in a direction toward the lower edges of the annular members 58, 59, i.e. that the filler 65 acts as a wedge and firmly holds the ends 71a of reinforcing threads 71 in order to provide a safe and strong connection between the main flexible component $C_4$ and the rigid upper component $A_4$. It will be noted that FIG. 8 shows a connection wherein only the thread ends 71a are embedded in the filler 65 though it is normally preferred to provide at least sporadic direct contact between the filler and the flexible component.

The connection between the felt- or textile strips 76, 77 and the end portion 75a of the lining 75 may be established by heating the material of the end portion 75a to such an extent that it becomes plastic and by simultaneously pressing the plasticized lining against the strips so that the material of the lining at least partially penetrates the pores of the strips 76, 77, whereupon the strips are embedded in the filler 70. The gasket 68 simultaneously seals the cargo chamber CC and the intermediate space S between the flexible component $C_4$ and its lining 75 against the entry of atmospheric air.

FIG. 9 illustrates a connection between a rigid component $A_5$ and a flexible component $C_5$, the latter assuming the form of a cable or rope and serving as a suspending device to replace the eye 2 shown in FIG. 1 or the eye 37 of FIG. 5. The rigid component $A_5$ may constitute the upper end plate of a collapsible container III of the type described in full detail in my aforementioned copending application Serial No. 684,813. The rigid component $A_5$ is formed with an inclined conical bore or space 85 which diverges outwardly in a direction from the upper toward the lower side of the component $A_5$. The space 85 receives a hard filler 86 which serves as a means for connecting the end portion 87a of the flexible component $C_5$ to the rigid component $A_5$.

The acute angle α enclosed by the axis 88 of the conical space 85 and the upper side of the rigid component $A_5$ is selected in such a way that the flexible component $C_5$ need not be flexed at the point where it emerges from the space 85 to pass toward and to be suspended on the hook 89 of a crane or the like. The wall of the space 85 at the upper side of the rigid component $A_5$ is rounded, as at 90, to insure that the flexible component $C_5$ cannot be worn away if its inclination with respect to the upper side of the rigid component $A_5$ assumes an angle other than the angle α.

It is preferred to provide the end portion 87a of the flexible component $C_5$ with a deformable sleeve 91 whose diameter is larger than the diameter of the upper end of the space 85 (within the rounded wall portion 90) so that the sleeve 91 actually seals one end of this space when it assumes the position of FIG. 9. In the next step, a liquefied synthetic resin is poured into the space 85 to form the filler 86 and to provide a firm bond between the rigid component $A_5$ and the flexible component $C_5$. If the viscosity of the liquefied resin is so low that it can penetrate into the material of the end portion 87a, it is advisable to permeate the end portion 87a with a substance which repels the resin and which prevents excessive hardening of the flexible component in the space 85. For example, the end portion 85a may be immersed in paraffine before being inserted into the space 85.

An important advantage of the connection shown in FIG. 9 is that the hard filler 86 may be removed by drilling in the event that the flexible component $C_5$ requires replacement. Upon insertion of a new flexible component, the space 85 may be refilled with a synthetic resin or another filler material so that the container comprising the rigid component $A_5$, the main flexible component 92, and the non-illustrated second rigid component may be put to renewed use.

FIG. 10 illustrates a slightly modified connection between a different rigid component $A_6$ and a flexible component $C_6$ which latter again asumes the form of a cable or rope forming a part of or constituting the entire suspending device for a container. The rigid component $A_6$ assumes the form of an end plate which comprises a substantially disc-shaped or polygonal portion 95 and a downwardly extending collar like portion 95a. The end portion 96a of the flexible components $C_6$ is received in a deformable sleeve 97 which has a tight fit in an aperture 98 provided in the portion 95 of the rigid component $A_6$. The aperture 98 is bounded by a rounded wall 99 which prevents excessive wear and tear on the sleeve 97 and on the flexible component $C_6$. As shown, the randomly distributed ends 100 of the threads or wires of which the flexible component $C_6$ consists project beyond the end portion 96a and are embedded in a hard filler 101 which adheres to the inner side of the collar 95a and preferably also to the underside of the portion 95. Of course, the end portion 96a cannot be withdrawn from the aperture 98 in a direction indicated by the arrow 102 even if the filler 101 does not adhere to the rigid component $A_6$; however, it is normally preferred to provide a strong bond between the filler 101 and the rigid component $A_6$ in order to prevent a displacement of the end portion 96a in a direction counter to that indicated by the arrow 102. It will be noted that the axis 103 of the aperture 98 is perpendicular to the plane of the portion 95, i.e. the angle enclosed by the upper side of the rigid component $A_6$ and the flexible component $C_6$ is 90 degrees.

The rigid components of FIGS. 9 and 10 consist of a synthetic plastic material, e.g. a polyester which is reinforced by glass fibers. Of course, and as stated before, the rigid components may also consist of metal, of wood or of any other material which can withstand the stresses arising during the storage, handling or transportation of the container.

A very important advantage of the flexible connections shown in FIGS. 2–6 and 8–10 is that they may be formed at an extremely low cost and also that they need not include any mechanical parts such as chains, eyes, screws, shackles, thimbles or the like. Furthermore, the novel connections insure an organic bond between the flexible component and the rigid component, i.e. each thread or wire 100 of the connection shown, for example, in FIG. 10 is organically bonded to the filler 101 and hence to the rigid component $A_6$. The flexible components $C_5$, $C_6$ may consist of synthetic plastic material, of hemp or of steel wire, and may be utilized not only as suspending devices for a container but also as a means for maintaining a container in collapsed condition or for connecting two or more containers to each other.

Referring finally to FIG. 11, there is shown a further connection between a cable-like flexible component $C_7$ and a rigid component A. The latter comprises two suitably profiled members or shells 105, 106 which may be permanently or releasably secured to each other to form a substantially disc-shaped or polygonal end plate for a collapsible container. The outer shell 105 is formed with an aperture 107 which sealingly receives a sleeve 108 disposed about the lower end portion 109a of the flexible component $C_7$. The sleeve 108 consists of a deformable synthetic plastic or like material, and its lower end is embedded in the hard filler 110 which forms a block and whose configuration is such as to abut at least two mutually inclined sides of the rigid component $A_7$. As shown, the shells 105, 106 define between themselves an annular space 111 which accommodates the filler 110. The filler abuts against the inner side of the shell 105 and against the inner side of the latter's downwardly extending peripheral collar 105a. In addition, the length of the filler 110 is selected in such a way that it abuts against the upper side of the shell 106 in the space 111 so that the filler is held against movements in the space 111 even if it should become separated from the shell 105 or even if its material were such that it could not form a good bond with the material of the rigid component $A_7$. As shown, the randomly distributed threads or wires 112 of the flexible component $C_7$ project beyond the lower end of the sleeve 108 and are embedded in the hardened filler 110 so that the flexible component is integrally connected with the filler and is thus anchored in the rigid component $A_7$ since the filler cannot be withdrawn from the space 111 excepting upon complete separation from the flexible component. It will be seen that it is not always necessary to actually bond the filler to the rigid component as long as the filler is safely anchored in the latter, either by providing a conical space for the filler or by inserting the filler into a space of such configuration that the filler cannot be displaced when the container is in use. However, it is always necessary to provide a permanent bond between the flexible component and the filler, regardless of whether the flexible component assumes the shape of a tubular body or the shape of a cable. It will be readily understood that the configuration of the shell 106 shown in FIG. 11 may be such as to provide a space 111 of an area equal to or more closely approximating the configuration of the filler 110, i.e. that the filler may completely fill this space.

The filler which is described thereabove according to 5 in FIG. 2, 11 in FIG. 3, 23 in FIG. 4, 39 in FIG. 5, 39 in FIG. 6, 65 and 70 in FIG. 7, 65 and 70 in FIG. 8, 86 in FIG. 9, 101 in FIG. 10, 110 in FIG. 11 may consist e.g. of plastic material like epoxy resin which becomes rigid after polymerisation. Moreover this filler may be reinforced by the means of other materials, e.g. like sand, silicium carbide etc.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A tension-resistant suspending arrangement comprising a rigid component defining an annular space; a hard plastic body received in said annular space and bonded to the rigid component; and a tubular flexible component having an annular end portion extending into said annular space and permanently embedded in said hard plastic body so that said plastic body acts as sole tension transmitting means between and prevents separation of said components, said flexible component comprising at least one reinforcing layer consisting of threads having ends projecting beyond said end portion, at least some of said ends individually embedded in said plastic body.

2. In a container, a twin tension-resistant suspending arrangement comprising a rigid component including an outer annular member, and inner annular member within and defining with said outer annular member an annular space; a tubular flexible component having an end portion extending into said space; a hard plastic body received in said annular space and adhering to said annular members, said end portion permanently embedded in said hard plastic body so that said plastic body acts as sole tension transmitting means between and prevents separation of said components; an innermost annular member disposed within and secured to said inner annular member, said innermost annular member defining a second annular space; a second tubular flexible component disposed within said first mentioned flexible component and having an end portion extending into said second annular space; and a second hard plastic body received in said second annular space and adhering to said innermost annular member, said last mentioned end portion permanently embedded in said second plastic body so that said second plastic body acts as sole tension transmitting means between said second flexible component and said rigid component.

3. A suspending arrangement as set forth in claim 2, wherein at least one of said flexible components comprises at least one layer of threads having ends projecting beyond the respective end portion, said ends individually embedded in the respective plastic body.

4. A suspending arrangement as set forth in claim 2, wherein the radial dimension of at least one of said plastic bodies increases in a direction away from the respective flexible component so that said one plastic body is wedged between the respective annular members when the respective flexible component is subjected to tensional stresses in a direction to withdraw its end portion from said one plastic body.

5. In a container, a tension-resistant suspending arrangement comprising a rigid component including a conically diverging first annular member and a conically diverging second annular member, said annular members defining between themselves a conically diverging annular space; a hard plastic body received in said annular space and adhering to at least one of said annular members; and a tubular flexible component comprising a tubular end portion extending into said annular space and permanently embedded in said hard plastic body so that said plastic body acts as sole tension transmitting means between and prevents separation of said components, said flexible component further comprising reinforcing threads projecting beyond said end portion and individually embedded in said plastic body.

6. A towable floating container comprising, in combination, a tubular flexible cover member; a first and a second rigid end component each disposed adjacent one of the ends of said tubular flexible cover member, at least one of said rigid end components including an outer annular member and an inner annular member located within said outer annular member, said outer and inner annular members defining an annular space therebetween; and a hard bonding body positioned in said annular space and firmly bonded to the walls thereof and to the end portion of said tubular flexible cover member, said tubular flexible cover member having embedded therein lengthwise reinforcing threads, said threads having free ends protruding from the ends of said tubular flexible cover member and being firmly anchored in said hard bonding body.

References Cited by the Examiner

UNITED STATES PATENTS

| | | | |
|---|---|---|---|
| 592,899 | 11/97 | Willson | 285—239 |
| 2,180,960 | 11/39 | Kennedy | 285—238 |
| 2,329,966 | 9/43 | Wiggins | 220—81 X |
| 2,476,446 | 7/49 | Lindell | 220—67 X |
| 2,477,852 | 8/49 | Bacon | 154—45.9 |
| 2,725,087 | 11/55 | Potter | 150—0.5 |
| 2,751,109 | 6/56 | Moore | 220—80 |
| 2,899,103 | 8/59 | Ebert | 220—91 X |
| 2,951,613 | 9/60 | Hardigg | 220—80 X |
| 2,952,378 | 9/60 | Renslow | 220—5 |
| 2,978,004 | 4/61 | Smith | 220—24 X |
| 3,043,465 | 7/62 | Horner | 220—80 X |

FOREIGN PATENTS 704,473  3/41  Germany.

THERON E. CONDON, *Primary Examiner.*

EARLE J. DRUMMOND, *Examiner.*